(12) United States Patent
Uchida et al.

(10) Patent No.: US 7,635,432 B2
(45) Date of Patent: Dec. 22, 2009

(54) METHOD OF TREATING AT A HIGH-TEMPERATURE WASTE LIQUID FROM PRODUCTION PLANT FOR HYDROCARBONS OR OXYGEN-CONTAINING COMPOUNDS

(75) Inventors: Masayuki Uchida, Narashino (JP); Hiroaki Ikebe, Narashino (JP); Takaji Akiya, Tokyo (JP); Toshio Tsukamoto, Tokyo (JP)

(73) Assignees: Toyo Engineering Corporation, Chiyoda-ku, Tokyo (JP); Water Re-Use Promotion Center, Chuo-ku, Tokyo (JP); Ebara Corporation, Ohta-ku, Tokyo (JP)

( * ) Notice: Subject to any disclaimer, the term of this patent is extended or adjusted under 35 U.S.C. 154(b) by 0 days.

(21) Appl. No.: 11/731,023

(22) Filed: Mar. 29, 2007

(65) Prior Publication Data
US 2007/0241053 A1    Oct. 18, 2007

(30) Foreign Application Priority Data
Mar. 31, 2006    (JP)    ............................. 2006-099160

(51) Int. Cl.
*C02F 3/00*    (2006.01)
(52) U.S. Cl. .................. 210/610; 210/620; 210/908
(58) Field of Classification Search .................. 210/610, 210/620, 908
See application file for complete search history.

(56) References Cited

U.S. PATENT DOCUMENTS 6,500,340 B1 * 12/2002 Burke .......................... 210/601
6,966,983 B1 * 11/2005 McWhirter et al. ......... 210/150

FOREIGN PATENT DOCUMENTS

| EP | 0 699 172 | 10/1997 |
| JP | 07-232178 | 9/1995 |
| JP | 08-024885 | 1/1996 |
| JP | 09-253696 | 9/1997 |
| JP | 11-019685 | 1/1999 |
| JP | 11-019686 | 1/1999 |

OTHER PUBLICATIONS

"Haisuishori no Seibutsugaku (Biology of Waste Liquid Treatment)", by Ryu-ichi Sudo, Sangyo Yosui Chosakai, Jun. 12, 1977—Excerpted English Translation.

* cited by examiner

*Primary Examiner*—Chester T Barry
(74) *Attorney, Agent, or Firm*—Flynn, Thiel, Boutell & Tanis, P.C.

(57) ABSTRACT

A method of treating organic matter-containing waste liquid, which is formed as a byproduct in a plant for the production of oxygen-containing compounds or liquid hydrocarbons (including liquid fuel oil and chemicals, which are produced from natural gas through a synthetic gas), having the step of: treating the waste liquid at a high temperature of 40° C. or higher, while being aerated, by using a membrane bioreactor (2) that is equipped with a separation membrane (7b).

7 Claims, 2 Drawing Sheets

METHOD OF TREATING AT A HIGH-TEMPERATURE WASTE LIQUID FROM PRODUCTION PLANT FOR HYDROCARBONS OR OXYGEN-CONTAINING COMPOUNDS

FIELD OF THE INVENTION

The present invention broadly relates to the field of treatment of waste liquid, and specifically relates to a method of treating waste liquid, which is formed from a plant for the production of hydrocarbons or oxygen-containing compounds.

BACKGROUND OF THE INVENTION

Industrial waste liquid may contain organic matter, as a byproduct, such as formaldehyde or methanol. Such waste liquid is discharged after it is treated to make the concentration of formaldehyde fit a waste liquid standard. As a method of treating formaldehyde or methanol in the waste liquid, the activated sludge method is used, in many cases.

In general, the preferable water temperature of the activated sludge method is considered to range from 20° C. to 30° C., as described, for example, in "Haisuishori no Seibutsugaku (Biology of Waste Liquid Treatment)", written by Sudo, published by Sangyo Yosui Chosakai (Jun. 12, 1977). When the temperature exceeds 35° C., the activity of microorganisms in activated sludge deteriorates to some extent.

Specifically, JP-A-11-19685 ("JP-A" means unexamined published Japanese patent application), JP-A-11-19686, JP-A-9-253696, and JP-A-7-232178 disclose methods of treating formaldehyde-containing waste liquid, in which the period of acclimatization can be made short or is not required. Among those, JP-A-11-19685 and JP-A-11-19686 describe methods of using a specific microorganism capable of decomposing high-concentration formaldehyde. Further, JP-A-9-253696 and JP-A-7-232178 describe methods of decomposing formaldehyde without using any activated sludge. The methods described in JP-A-9-253696 and JP-A-7-232178, which are different from any activated sludge method, require the setting up of facilities and catalysts, to raise the temperature and pressure of the waste liquid to be treated.

On the other hand, as to facilities for waste liquid treatment in the activated sludge method, JP-A-8-24885 discloses a method of using a microfiltration membrane filter, thereby omitting a sedimentation tank for sludge, which is conventionally necessary in the activated sludge method, and saving on facility-installation space.

Further, in European Patent No. 0 699 172, a membrane bioreactor (MBR) for treating waste liquid which contains a hydrocarbon is disclosed.

Incidentally, in recent years, the demand for water has been increasing, based on a rising population, and the amount of water that can be used per person has been increasing, based on an improvement in the level of living, while new development of water (fresh water) resources has not been pursued. Further, the demand for water that can be used to produce food has also been increasing, from the rise in population. As a result, insufficiency of water resources has been coming to the fore as a big problem.

In particular, water reuse has been actively practiced in regions where new water resources are hard to obtain.

Under such circumstances, stringent countermeasures against water shortage problems have been demanded also in industrial fields where relatively large amounts of water are consumed. In plants, water is used in various systems, as necessary utilities for the process of producing products, such as boiler feed water, cooling water, or general service water. Since the reduction of the consumption of such valuable water is directly related with the reduction of production costs, active reuse of waste liquid has been practiced or studied in each plant.

More specifically, waste water or sullage discharged (formed) following reactions in chemical plants or the like, is treated for reuse as boiler feed water or general service water in plants, industrial complexes, or the like. However, waste water formed in chemical plants and water generated by chemical reactions are often discharged at a temperature of 100° C. or higher without any appropriate treatment. In such cases, the waste water cannot be biologically treated without appropriate treatment, because the temperature suitable for the activity of aerobes (bacteria) in activated sludge used for biological treatments (hereinafter simply referred to as "active temperature") is generally in the range of from 10° C. to 35° C. Therefore, under the status quo, such waste water must be cooled to a temperature of at least about 30° C.

However, when biologically treated waste liquid is reused as boiler feed water in a plant, the water must be reheated to a temperature of 100° C. or higher. More specifically, there is a disadvantage of poor energy efficiency for the whole process of cooling waste liquid at a temperature of 100° C. or higher down to about 30° C. for biological treatment and reheating the resultant water liquid to 100° C. or higher.

In areas where the ambient temperature is high, such as the Middle East, the lowest temperature which can be reached by cooling with seawater, which is a low-cost cooling medium, is 40° C., and further cooling requires a particular cooling medium and installation of a freezer.

SUMMARY OF THE INVENTION

The present invention contemplates establishing the specification of an apparatus for the treatment of a waste liquid containing any hydrocarbon or formaldehyde, which is discharged from a plant or factory, thereby to apply the activated sludge method to said waste liquid treatment, and providing a method and apparatus for stably achieving a treatment which enables water reuse. In particular, the present invention contemplates providing a technique which is a biological method of treating a waste liquid from plants, allows the treatment at relatively high temperatures, achieves energy savings in the whole plants, removes formaldehyde, and effectively recovers water for reuse as industrial water.

The present invention resides in a method of treating an organic matter-containing waste liquid, which is formed as a byproduct in a plant for the production of oxygen-containing compounds or liquid hydrocarbons (including liquid fuel oil and chemicals, which are produced from natural gas through a synthetic gas), characterized by comprising the step of:

treating the waste liquid at a high temperature of 40° C. or higher, while being aerated, by using a membrane bioreactor that is equipped with a separation membrane.

Other and further features and advantages of the invention will appear more fully from the following description, appropriately referring to the accompanying drawings.

DETAILED DESCRIPTION OF THE INVENTION

Figure 1:
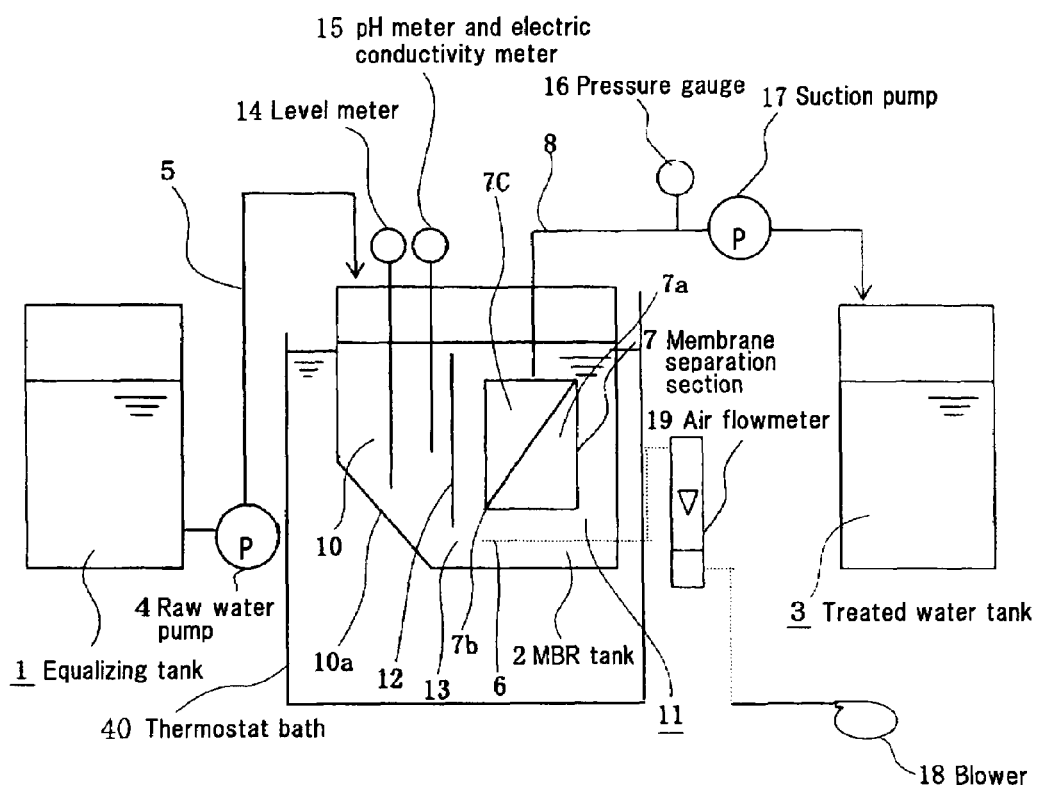
FIG. 1 is a flow chart of an apparatus for acclimatization of seed sludge, as demonstrated with the present invention.

According to the present invention, there are provided the following means:

(1) A method of treating an organic matter-containing waste liquid, which may be at a high temperature, and which is formed as a byproduct in a plant for the production of oxygen-containing compounds or liquid hydrocarbons (including liquid fuel oil and chemicals, which are produced from natural gas through a synthetic gas), comprising the step of:

treating the waste liquid at a high temperature of 40° C. or higher, while being aerated, by using a membrane bioreactor that is equipped with a separation membrane;

(2) The method of treating the waste liquid as described in Item (1), wherein the organic matter-containing waste liquid contains formaldehyde;

(3) The method of treating the waste liquid as described in Item (2), wherein a BOD sludge load is controlled according to the residual level of formaldehyde in at least one of membrane bioreactor water and treated water;

(4) The method of treating the waste liquid as described in any one of Items (1) to (3), wherein the BOD load is controlled according to at least one of pH and electric conductivity, each measured for at least one of membrane bioreactor water and treated water;

(5) The method of treating the waste liquid as described in any one of Items (1) to (4), wherein the temperature is raised stepwise from a temperature condition of 35° C. or lower in each increment of 7° C. or less for acclimatization of activated sludge resistant to a high temperature of 40° C. or higher in the membrane bioreactor, preferably the acclimatization is conducted raising the acclimatization temperature to 40° C. or over;

(6) The method of treating the waste liquid as described in any one of Items (1) to (5), wherein a nutritive salt is added to the membrane bioreactor and/or in a treatment step prior to the membrane bioreactor such that 0.02 to 0.05 parts by mass of nitrogen and 0.004 to 0.01 parts by mass of phosphorus be added with respect to 1 part by mass of BOD;

(7) A method of producing reclaimed water, wherein the method of treating the waste liquid as described in any one of Items (1) to (6) is used;

(8) The method of producing reclaimed water as described in Item (7), wherein the oxygen-containing compound is dimethyl ether and GTL (Gas to Liquid);

(9) An apparatus of treating waste liquid, having:

a cooler for cooling at least one selected from the group consisting of organic matter-containing waste liquid, which is formed as a byproduct in a plant for the production of oxygen-containing compounds or liquid hydrocarbons (including liquid fuel oil and chemicals, which are produced from natural gas through a synthetic gas), and membrane bioreactor water, to a temperature of 40 to 45° C., wherein the cooler is provided in a treatment step prior to the membrane bioreactor and/or in the membrane bioreactor;

(10) The apparatus of treating the waste liquid as described in Item (9), wherein a waste liquid equalizing tank is provided for adjusting and controlling a BOD sludge load;

(11) The apparatus of treating the waste liquid as described in Item (9) or (10), wherein at least one among a formaldehyde concentration meter, a pH meter, and an electrical conductivity meter is provided for adjusting and controlling the BOD sludge load; and

(12) The apparatus of treating the waste liquid as described in any one of Items (9) to (11), wherein equipment for adding a nutritive salt is provided in the membrane bioreactor and/or in a treatment step prior to the membrane bioreactor.

In the present invention, the term "reclaimed water" means to include agricultural water, intermediate water (middle or gray water), or industrial water including boiler feed water, each of which is obtained by treating waste liquid.

Herein, the term "high temperature", for example, of waste water to be treated, means a temperature in a range of generally not lower than 40° C. but not higher than 45° C., preferably higher than 40° C. but not higher than 45° C., and more preferably higher than 40° C. but not higher than 43° C.

The present inventors, having made eager investigations, have found out that waste liquid formed as a byproduct in a plant for producing an oxygen-containing compound, such as dimethyl ether (referred to as 'DME' herein), or a liquid hydrocarbon, such as GTL (gas to liquid, liquid fuel oil produced from gaseous components), contains formaldehyde, methanol, formic acid, or the like as trace constituents; however, the waste liquid hardly contains any salt or metal, or it contains a salt or metal merely to such a degree that no problem is caused when the waste liquid is used as boiler feed water or industrial water. Further, the inventors have found out that this waste liquid can be effectively reused at low costs, for example, as industrial water, including boiler feed water, by treating the waste liquid with a membrane bioreactor.

On the other hand, as described above, microorganisms in activated sludge, which are used for the usual sewage treatment or treatment of industrial waste liquid, have active temperature of 30 to 35° C. at the highest, and therefore they cannot be used for the biological treatment of plant waste liquid usually discharged at a temperature of about 100° C. However, according to the specific method mentioned herein, we found that the active temperature can be increased by acclimatization using plant waste liquid, whereby the byproduct waste liquid can be treated even at a high temperature over 40° C. The present invention has been accompanied based on those findings.

The present invention is further described below in detail.

The seed sludge of the activated sludge having a higher active temperature that can be used in the present invention is not particularly limited, and can be obtained by collecting a sludge (seed sludge) in an arbitrary sewage treatment plant or industrial waste liquid treatment plant. The seed sludge is preferably collected in a treatment plant which treats waste liquid having properties as similar as possible to those of components in the waste liquid to be treated, to thereby make it possible to shorten the period of time of acclimatization.

In order to obtain activated sludge having properties suitable for the present object from the thus-collected seed sludge, the concentration (BOD load) and temperature of the waste liquid to be treated are gradually increased each by each in an alternating manner, over a period of time of, for example, about 1 to 3 weeks.

It is not easy to unequivocally define the procedure for changing the temperature or concentration conditions, since they are changed when the TOC level of the treated water becomes stabilized, or the pH becomes a given value as described below, more specifically when the rate of removal of organic matters is confirmed to have reached a predetermined level. The period of time is adjusted appropriately, according to the collected seed sludge. Acclimatization of the seed sludge is preferably performed by stepwise increasing either the concentration (BOD load) or temperature of the waste liquid. With regard to the temperature, for example, incubation is performed at a predetermined temperature with stepwise increasing the temperature in each increment of 7° C. or less, more preferably in each increment in the range of 3° C. to 6° C., and the temperature is finally increased to over 40° C. With regard to the period of time, the incubation is performed until the rate of removal of organic matters reaches a predetermined level. When the increment of the temperature to be raised stepwise is too small, the procedure becomes complicated and acclimatization takes a longer period of time. On the other hand, when the increment is too large, the activated sludge is destroyed or inactivated by shock. It is particularly preferable to increase the temperature of the waste liquid fed to the aeration tank in each increment of about 5° C. or around. The load and temperature are increased stepwise in an alternate manner during acclimatization, and the BOD load of the waste liquid fed to the aeration tank is increased in each increment of preferably 1.3 to 2.1 times, more preferably 1.6 to 1.8 times, and particularly preferably about 1.7 times the previous step. When the increment of the BOD load of the waste liquid in the stepwise raising is too small, the procedure becomes complicated and acclimatization takes a longer period of time. On the other hand, when the increment is too large, the rate of the removal of organic matters from the activated sludge becomes conspicuously poor, which interferes with the accomplishment of acclimatization.

The thus-obtained activated sludge having a higher active temperature is incubated in a membrane bioreactor aeration tank to be used for waste liquid treatment, at a temperature of 40° C. to 45° C., to cause decomposition into carbon dioxide and water.

For cooling the organic matter-containing high-temperature waste liquid and/or membrane bioreactor water, each of which is formed as a byproduct in a plant, to a temperature of 40 to 45° C., it is preferable to provide a cooler, such as a heat exchanger, in a treatment step prior to the membrane bioreactor and/or in the membrane bioreactor. The treatment step prior to the membrane bioreactor is not limited, and examples thereof include a pipe from the plant, a waste water equalizing tank, an air stirring pipe in a waste water equalizing tank, a waste water pipe connected to a waste water equalizing tank, a membrane bioreactor, an air stirring pipe of a membrane bioreactor, and a waste water pipe connected to a membrane bioreactor.

In the membrane bioreactor, reaction products permeate through a membrane to be taken out of the system, thus no solid-liquid separation operation is necessary, which allows omitting some solid-liquid separation equipment (for example, a sludge sedimentation tank).

When waste liquid containing a large amount of formaldehyde is treated by the activated sludge method, filamentous bacteria proliferate to conspicuously deteriorate the settling property of the sludge, thus the sludge cannot be separated by a usual settling filtration method. Therefore, the use of the membrane bioreactor having a membrane separation function is particularly suitable to the present invention.

In the present invention, it is preferable that the treatment of waste water is preferably conducted at a temperature over 40° C., from the viewpoint of energy saving in the plant as a whole.

The optimum pH for microorganisms which play an important role in waste liquid treatment is in the vicinity of neutral, between pH 6 and 8. Formaldehyde is a neutral substance per se, and the pH scarcely changes when it is decomposed to carbon dioxide by microorganisms. However, with regard to the pH change during operation, according to the study by the inventors of the present invention, it has been found that if formaldehyde remains because of an overload and deficiency of the dissolved oxygen concentration, formic acid also remains as an intermediate product of decomposition, which decreases the pH in the aeration tank and treated water. Taking advantage of this behavior, an operation which does not leave formaldehyde in the aeration tank becomes possible by controlling the load of waste liquid according to the pH in the aeration tank. As a specific example of the operation, when the operation is carried out at a pH of 6 to 8, the inflow of waste liquid is halted when the pH becomes 6 or lower, and the inflow of waste liquid is resumed when the pH exceeds 6 again. Thus, by steadily monitoring the pH, the pH change by residual formaldehyde is found and detected at an early stage, which allows a stable operation.

Chemical plant waste liquid targeted by the present invention contains few components, particularly salts, except for formaldehyde and other organic components, thus the electric conductivity in the waste liquid is ascribable to the slight dissociation of the above-described substances in the water. Accordingly, it has been found that the electrical conductivity in the aeration tank and treated water is higher when formaldehyde and others remain undecomposed than when formaldehyde and others are completely oxidation-decomposed to carbon dioxide and water. Taking advantage of this behavior, an operation which does not leave formaldehyde in the aeration tank becomes possible by controlling the load of waste liquid according to the electrical conductivity in the aeration tank. The electrical conductivity of waste liquid varies due to the properties of the waste liquid. As a specific example of the operation, when an operation is carried out at an electrical conductivity of 3 to 5 mS/m, the inflow of waste liquid is halted when the electrical conductivity becomes 5 mS/m or higher, and the inflow of waste liquid is resumed when the electrical conductivity becomes lower than 5 mS/m again. Thus, by steadily monitoring the electrical conductivity, the change in electrical conductivity by residual formaldehyde is found and detected at an early stage, which allows a stable operation.

As described above, it is preferable in the present invention to adjust the BOD load for preventing formaldehyde from remaining in the aeration tank. Therefore, it is preferable to provide a waste liquid equalizing tank that functions as a buffer tank for equalizing the concentration of the waste liquid, or adjusting the waste liquid flow rate according to the situation in the aeration tank, and to control the role of the waste liquid equalizing tank.

Since a chemical plant waste liquid targeted by the present invention contains few components except for formaldehyde and other organic components, it is preferable to add a nutritive salt(s) necessary for microorganisms when they metabolize formaldehyde and other organic components. Among nutritive salts, nitrogen and phosphorus salts are particularly deficient, which should be added adequately. Specifically, it is preferable to add 0.02 to 0.05 parts by mass of nitrogen, and 0.004 to 0.01 parts by mass of phosphorus, with respect to 1 part by mass of BOD. If the amount of the nutritive salt is too low, the activity of the microorganisms may deteriorate, and if too large, the nutritive salt may remain in the resultant treated water. It is needless to say that the added amount of the nutritive salt may be adjusted, according to the inherent content of the salt in the raw water. The total of the inherent content and the added amount is preferably in a proportion of 0.02 to 0.05 parts by mass of nitrogen, and 0.004 to 0.01 parts by mass of phosphorus, with respect to 1 part by mass of BOD. The nutritive salt(s) can be added to a point such that the nutritive salt is distributed all around the bioreactor, and is generally added directly to the bioreactor, or added to a previous step preceding the bioreactor. The nitrogen source to be added is not particularly limited, but generally urea, ammonium sulfate, ammonium chloride, ammonia, or the like can be used. The phosphorus source to be added is also not particularly limited, but generally use may be made, for example, of dipotassium hydrogen phosphate, potassium dihydrogen phosphate, disodium hydrogen phosphate, sodium dihydrogen phosphate, or phosphoric acid.

Some preferable embodiments of the method of the present invention are further illustrated by the accompanied drawings. In FIG. 1, numeral 1 indicates an equalizing tank which stores a waste liquid and equalizes the waste liquid concentration, numeral 2 indicates a membrane bioreactor (hereinafter referred to as MBR tank) which aerates the waste liquid, and numeral 3 indicates a treated water tank.

The waste liquid to be treated is fed by a raw water pump 4 from the equalizing tank 1 to the MBR tank 2 through a line 5. Air is blown from a lower exhaust nozzle 6 to the waste liquid in the MBR tank, and the organic matters in the waste liquid are decomposed to carbon dioxide and water, by aerating with microorganisms or enzymes in the activated sludge filled in the MBR tank. The water in which the above decomposition products are dissolved flows from a raw water side 7a into a membrane separation section 7, filtered by a separation membrane 7b, taken out from a permeated water side 7c through a line 8, and fed to the treated water tank 3. Numeral 12 indicate a dividing plate which divides the MBR tank 2 into a waste liquid inflow part 10 and a waste liquid treating part 11, and a space 13 is provided between the lower edge of the dividing plate and the bottom surface of the MBR tank, to form a channel for the waste liquid.

In the MBR tank, a bottom 10a of the waste liquid inflow part 10 is formed with a sloped or a slanted surface. In FIG. 1, numeral 14 indicates a level meter, numeral 15 indicates a pH meter and an electrical conductivity meter, numeral 16 indicates a pressure gauge, and numeral 17 indicates a suction pump. Numeral 18 indicates a blower which blows the air into the MBR tank, and numeral 19 indicates an air flowmeter.

The MBR tank is preferably entirely provided in a thermostat bath 40, as shown in FIG. 1.

Generally, a microfiltration membrane is used as the separation membrane 7b, but a microporous membrane, ultrafiltration membrane, or the like may also be used singly or in combination of a plurality of these appropriately selected, according to the requested quality of treated water. The diameter of the blocking particles is 0.001 to 1 μm, and generally preferably about 0.002 to 0.5 μm. As the material of the membrane, various materials are developed and commercially available, such as polytetrafluoroethylene (trade name, Teflon), polysulfone, polyvinyl chloride, cellulose acetate, polyamide, polycarbonate, nitrocellulose, cellulose, reclaimed cellulose, triacetyl cellulose, acryl polymer, polypropylene, polyethylene, propylene-crosslinked polyvinyl alcohol, and polyvinylidene fluoride, and various types of membrane separation equipment using any of the above membranes are also developed and commercially available. An appropriate membrane may be selected from the above-mentioned ones to use.

In general, the water temperature is preferably 40° C. or lower for preventing the deterioration of the membrane. The water temperature at the membrane surface can be brought to about 40° C. with the latent heat of vaporization in the aeration tank, by adjusting the water temperature to generally 45° C. or lower, preferably 43° C. or lower.

In the present embodiment, two pieces of NEM-455-L, manufactured by Mitsubishi Rayon Co., Ltd. were used (separation area 0.2 m$^2$/piece, pore diameter 0.4 μm; material, polyethylene (PE); hollow fiber inside diameter 350 μm; dimension, 50 mmφ×width 227 mm×height 397 mm).

According to the present invention, organic matter-containing waste liquid (byproduct water containing formaldehyde, methanol, and the like) that is produced as a byproduct in a production plant for hydrocarbons or oxygen-containing compounds, can be biologically and efficiently treated without significant cooling, and can be reused as a new water resource (reclaimed water) for industrial water such as boiler feed water, for example.

The present invention will be described in more detail based on the following examples, but the invention is not intended to be limited thereto.

EXAMPLES

Example 1

In accordance with a flow sheet shown in FIG. 1, the waste liquid shown in Table 1 was decomposed. In the treatment process, the steps of the first half were acclimatization of seed sludge, and the steps of the latter half were the high-temperature decomposition treatment of the waste liquid, as shown in Table 1, using the thus-acclimatized, high-temperature resistant activated sludge.

(1) Fed Waste Liquid (Simulated Waste Liquid)

(a) Tap water was added with the components including HCHO at concentrations, as shown in Table 1, to prepare the simulated waste liquid, which was used as the fed waste liquid to be tested.

(b) Seed sludge: sewage treatment sludge in the above-described test plant was used.

TABLE 1

Composition of the fed waste liquid

| Item | | Concentration [mg/L] |
|---|---|---|
| Formaldehyde | HCHO | 160 |
| 1-Butyl alcohol | $C_4H_9OH$ | 63 |
| Methyl alcohol | $CH_3OH$ | 22[1)] |
| Formic acid | HCOOH | 7 |
| Urea | $(NH_3)_2CO$ | 40[2)] |
| Potassium dihydrogen phosphate | $KH_2PO_4$ | 16[2)] |

Note
[1)]Since the HCHO solution (36-mass % HCHO, 5-mass % $CH_3OH$) contained methanol as a stabilizer, $CH_3OH$ was 22 mg/L under the condition that HCHO was 160 mg/L.
Note
[2)]Nutritive salts added to the activated sludge.

(2) Bench Scale Test (Test Conditions are Shown in Table 3.)

(a) In Run 1, as the seed sludge, an activated sludge from sewage treatment (active temperature 25° C.) was acclimatized, for 16 days, at a temperature of 25° C., under a low BOD load (0.05 g/g·day) in the simulated waste liquid containing HCHO alone.

(b) In Run 2 and the following Runs, the simulated waste liquid of the composition shown in Table 2 was prepared and used, with reference to the previous analysis values of actual waste liquid from a DME plant.

(c) The operation was carried out under the same BOD load (30° C.) for 22 days, and at the point when the TOC concentration in the treated water was stabilized, the sludge load was gradually increased as shown in Table 3, thus an acclimatization test of the sludge against HCHO was carried out. The BOD load was controlled by increasing the amount of treated water. The target sludge load in the acclimatization test was set to 0.2 g/g·day.

(d) The tests were carried out at a water temperature in the aeration tank of 25° C. in Run 1, and 30° C. in Runs 2 through 3, respectively. In Run 4, the water temperature was increased to 35° C., where the TOC concentration in the treated water was stable. Then, the water temperature was raised to 40° C. in Run 5 and the following Runs, and in Run 9, a treatment test at a high water temperature of 42° C. was carried out.

(e) The concentration of MLSS (Mixed liquor Suspended Solid: active suspended matter in the aeration tank) was controlled between 4,000 and 6,000 mg/L by appropriately removing the sludge from the aeration tank.

(f) Sedimentation property of the sludge was evaluated with SV and SVI.

(g) Analysis items and analysis frequency: analysis items and analysis frequency are shown in Table 2.

TABLE 2

Analysis item and frequency

| Item | Raw water | Treated water | Aerated water |
|---|---|---|---|
| pH | ○ | ○ | — |
| BOD | Δ | Δ | — |
| COD | Δ | Δ | — |
| HCHO | ▲ | ▲ | — |
| HCHO (Simplified method) | ○ | ○ | — |
| TOC | ○ | ○ | — |
| MLSS | — | — | ▲ |
| MLSS (Simplified method) | — | — | ○ |
| MLVSS | — | — | ▲ |
| $SV_{30}$ | — | — | ○ |
| SVI | — | — | Δ |
| Temperature | — | — | ○ |

○ = once a day,
Δ = once a week,
▲ = once per 3 to 4 weeks (about once per "Run" Step)

The test results are shown in Table 3.

The treatment performance conspicuously deteriorated at high temperatures higher than 45° C.

Figure 2:
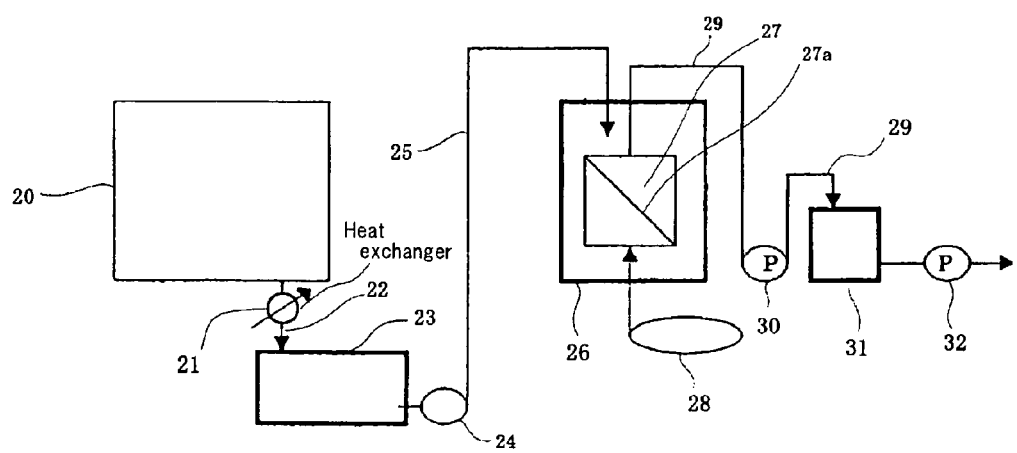
FIG. 2 is a flow chart where the acclimatized sludge, which is obtained according to the present invention, is applied to an actual plant.

When the activated sludge obtained in Runs 5 thorough 9 are applied in a large DME plant and a large GTL plant, as preferable embodiments of the present invention, it is preferable to use the flow, as shown in FIG. 2, mentioned below.

Furthermore, in the case where the temperature was raised from 25° C. to 40° C. at once, i.e. no stepwise rise of temperature was taken, formaldehyde remained in the treated water and, resultantly, it was difficult to conduct further treatments thereafter.

Furthermore, as a method of treating waste water at a lower temperature, the present inventors developed a method of treating a formaldehyde-containing waste liquid: by subjecting formaldehyde in the liquid to chemical treatment; and treating the resulting waste liquid, while being aerated, by using a membrane bioreactor (see PCT/JP2005/019836). In that method, formaldehyde was converted into another substance, such as formic acid, by conducting the chemical treatment (Cannizarro reaction) before the biological treatment with the membrane bioreactor, and there is no remaining formaldehyde, which is toxic to microorganisms. Therefore, the aforesaid method has no need of a particular operation(s) with respect to setting temperature or load as done in the present invention, rather the method can use a usual microorganism as it is without acclimatization. The example section in the specification of PCT/JP2005/019836, then, has a description that the treatment was conducted at a temperature in a range of 30° C. to 40° C. without controlling the temperature and the temperature was allowed to fluctuate from 30° C. to 40° C., since there is no particular idea of precisely controlling the temperature for treating waste water, which means that even when the temperature was raised to 40° C. during the treatment due to the fluctuation of treatment temperature, the treatment was not, in fact, continued at 40° C. and it was impossible to continue the treatment at a temperature as high as 40° C.

TABLE 3

| Run | Number of days [Day] | Temp. [° C.] | Sludge load [g/(g·d)] BOD | Sludge load [g/(g·d)] HCHO | Quality of the treated water [mg/L] HCHO | Quality of the treated water [mg/L] TOC | Quality of the treated water [mg/L] BOD | COD | Remarks |
|---|---|---|---|---|---|---|---|---|---|
| 1 | 16 | 25 | 0.045 | 0.045 | <0.1 | 2.0 to 2.1 | 2.0 | — | Containing HCHO only |
| 2 | 22 | 30 | 0.040 | 0.021 | <0.1 | 8.9 to 11.3 | 1.7 to 4.9 | 28 | |
| 3 | 18 | 30 | 0.067 | 0.037 | <0.1 | 2.3 to 3.8 | 1.0 to 1.1 | — | |
| 4 | 3 | 35 | " | " | <0.1 | 2.2 to 2.4 | <1 | — | |
| 5 | 12 | 40 | " | " | <0.1 | 3.5 to 8.2 | 1.0 to 3.9 | 15 | |
| 6 | 9 | 40 | 0.11 | 0.061 | <0.1 | 3.7 to 5.3 | 1.0 | 7 | |
| 7 | 11 | 40 | 0.12 | 0.069 | 0.1 | 3.5 to 4.2 | 1.0 | 12 | |
| 8 | 11 | 40 | 0.22 | 0.12 | 0.2 | 3.7 to 4.7 | 3.0 to 5.0 | — | |
| 9 | 18 | 41 to 45 | 0.21 | 0.12 | <0.1 | 4.3 to 5.2 | 6.0 to 15.7 | 11 | |

In the above Run 5 to Run 8, at the high temperature condition of 40° C., the sludge load of BOD was increased, stepwise, from 0.067 g/(g·d) [Run 5], to 0.11 g/(g·d) [Run 6], 0.12 g/(g·d) [Run 7], and 0.22 g/(g·d) [Run 8]. As a result, under each load, the quality of the treated water was quite favorable that the concentration of formaldehyde was 0.2 mg/L or less and the BOD was 5 mg/L or less. Further, it can be understood that, in the Run 8 in which the sludge load was made higher, the excellent results were also exhibited.

Example 2

The treatment test was conducted in the same manner as in Example 1, except that the BOD load was determined according to the pH in the aeration tank, instead of the measurement of the formaldehyde concentration in the aeration tank and treated water. The feed of waste liquid was halted when the pH in the aeration tank became below 6.5, and the feed of waste liquid was resumed after the pH became 6.5 or higher again. Further, the load was gradually increased in each 1.5-fold increment at the point when it was confirmed that the pH in the aeration tank remained 6.5 or higher for 3 days or longer.

Table 4 shows the set load and treatment performance at 43° C. after a lapse of time of one month. At that point, the set load was 0.15 kg/(kg-SS·d), and the quality of treated water was: pH 6.7 to 7.1, formaldehyde concentration 0.1 mg/L or lower, BOD 5 mg/L or lower, SS 1 mg/L or lower. The results of the treatment were as favorable as Example 1.

TABLE 4

| | BOD sludge load [kg/(kg − SS · d)] | Quality of treated water | | | |
|---|---|---|---|---|---|
| | | HCHO [mg/L] | pH [—] | SS [mg/L] | BOD [mg/L] |
| Example 2 | 0.15 | <0.1 | 6.7 to 7.1 | <1 | <5 |

In FIG. 2, waste liquid discharged from a plant 20, which is a waste liquid source, is cooled to about 40° C. by a heat exchanger 21. The thus-cooled waste liquid is sent to a tank 23 through a line 22, and then sent to a MBR tank 26, which is the same as the above-described one, by a pump 24 through a line 25. In the MBR tank 26, activated sludge which is prepared under the above-described BOD load so as to exhibit activity at high temperatures of 40° C. or higher and 45° C. or lower, is provided. The waste liquid is aerated by the activated sludge, in the presence of the air blown thereinto by a blower 28, to cause decomposition of organic matters therein. Then, the treated water is passed through a separation membrane 27a of a separation section 27, taken out from a line 29, and sent to a treated water tank 31 by a pump 30. The thus-treated water is, if necessary, sent by a pump 32, to be reused in an intended application.

The water from which HCHO is removed in the MBR tank 26, may be fed to a boiler, after desalting with a facility such as an ion exchange tower (not shown). Since the waste liquid is originally low in salinity, it is possible to downsize the ion exchange tower.

In comparison with the conventional cooling to a temperature of about 30° C., the above-mentioned cooling to a temperature of about 40° C. according to the present invention requires a remarkably less amount of heat for cooling and for reheating for use as boiler feed water.

Figure 3:
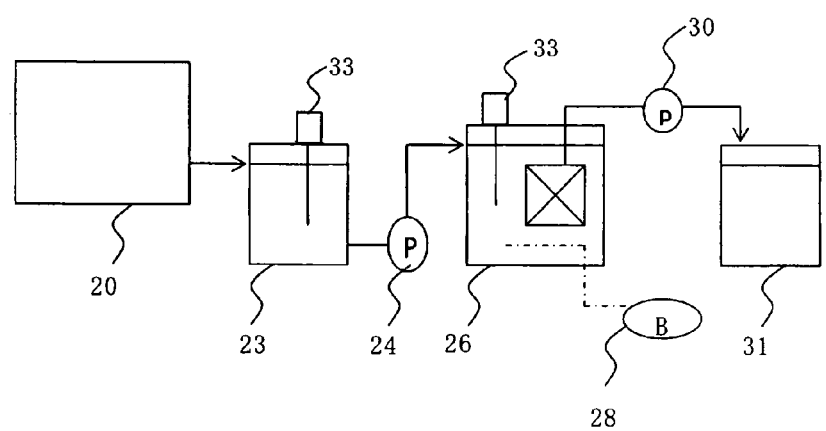
FIG. 3 is another flow chart where the acclimatized sludge, which is obtained according to the present invention, is applied to an actual plant.

Further, FIG. 3 shows a flow chart of another preferable embodiment of the present invention when applied to an actual plant. In FIGS. 2 and 3, the same numerals indicate the same elements. In FIG. 3, numeral 33 indicates a pH meter and electrical conductivity meter, and the heat exchanger 21 in FIG. 2 may be omitted in the present embodiment. The process of waste liquid treatment according to the flow chart in FIG. 3 is the same as described for FIG. 2.

The treating method of the present invention is preferable as a treating method for reusing, as a new water resource, waste liquid containing formaldehyde, which is formed as a byproduct in a plant for the production of hydrocarbons or oxygen-containing compounds, effectively at low costs.

Further, the treatment apparatus of the present invention is preferable to carry out the treating method of the present invention.

Having described our invention as related to the present embodiments, it is our intention that the invention not be limited by any of the details of the description, unless otherwise specified, but rather be construed broadly within its spirit and scope as set out in the accompanying claims.

This non-provisional application claims the priority under 35 U.S.C. § 119 (a) of Patent Application No. 2006-099160 filed in Japan on Mar. 31, 2006, which is entirely herein incorporated by reference.

What we claim is:

1. A method of treating organic matter-containing waste liquid, which is formed as a byproduct in a plant for the production of oxygen-containing compounds or liquid hydrocarbons, comprising the step of:

treating the waste liquid at a high temperature of from 40 to 45° C. with an activated sludge which is heat-resistant at the high temperature, while being aerated, by using a membrane bioreactor that is equipped with a separation membrane to make the waste liquid reusable.

2. The method of treating the waste liquid as claimed in claim 1, wherein the organic matter-containing waste liquid contains formaldehyde.

3. The method of treating the waste liquid as claimed in claim 2, wherein a BOD sludge load is controlled according to the residual level of formaldehyde in at least one of membrane bioreactor water and treated water.

4. The method of treating the waste liquid as claimed in claim 1, wherein the BOD load is controlled according to at least one of pH and electric conductivity, each measured for at least one of the water in a biological treatment water tank (MBR tank) and treated water.

5. The method of treating the waste liquid as claimed in claim 1, wherein the temperature is raised stepwise from a temperature condition of 35° C. or lower in each increment of 7° C. or less for acclimatization of activated sludge resistant to a high temperature of from 40 to 45° C. in the membrane bioreactor.

6. The method of treating the waste liquid as claimed in claim 1, wherein a nutritive salt is added to the membrane bioreactor and/or in a treatment step prior to the membrane bioreactor such that 0.02 to 0.05 parts by mass of nitrogen and 0.004 to 0.01 parts by mass of phosphorus be added with respect to 1 part by mass of BOD.

7. A method of producing reclaimed water, wherein the method of treating the waste liquid as claimed in claim 1 is used.

\* \* \* \* \*